(12) United States Patent
Eichenberger (10) Patent No.: US 12,479,492 B2
(45) Date of Patent: Nov. 25, 2025

(54) SNOWMOBILE STEERING SYSTEM

(71) Applicant: Polaris Industries Inc., Medina, MN (US)

(72) Inventor: Jeremy Eichenberger, Warroad, MN (US)

(73) Assignee: Polaris Industries Inc., Medina, MN (US)

( * ) Notice: Subject to any disclaimer, the term of this patent is extended or adjusted under 35 U.S.C. 154(b) by 133 days.

(21) Appl. No.: 18/208,517

(22) Filed: Jun. 12, 2023

(65) Prior Publication Data

US 2023/0399042 A1  Dec. 14, 2023

Related U.S. Application Data (60) Provisional application No. 63/351,126, filed on Jun. 10, 2022.

(51) Int. Cl.
| | |
|---|---|
| *B62B 17/06* | (2006.01) |
| *B62B 13/10* | (2006.01) |
| *B62D 1/184* | (2006.01) |
| *B62D 1/20* | (2006.01) |

(52) U.S. Cl.
CPC ............ *B62B 17/061* (2013.01); *B62D 1/184* (2013.01); *B62D 1/20* (2013.01); *B62B 13/10* (2013.01)

(58) Field of Classification Search
CPC ....... B62B 17/061; B62B 13/10; B62K 21/18; B62K 21/22
See application file for complete search history.

(56) References Cited

U.S. PATENT DOCUMENTS

| | | | |
|---|---|---|---|
| 4,337,962 A * | 7/1982 | Allen ...................... | F16B 2/065 403/245 |
| 6,125,958 A | 10/2000 | Olson et al. | |
| 7,559,576 B1 * | 7/2009 | Honkala .................. | B62K 5/01 280/775 |

(Continued)

FOREIGN PATENT DOCUMENTS

FR      2820106 A1 *  8/2002  ............. B62K 21/18

OTHER PUBLICATIONS

USPTO Machine Translation (retrieved from FIT database) of the Description of FR 2820106 A1, Durand, Aug. 2, 2002. (Year: 2025).*

*Primary Examiner* — Daniel D Yabut
(74) *Attorney, Agent, or Firm* — Merchant & Gould P.C.

(57) ABSTRACT

A snowmobile has a steering system with a handlebar, the system having a steering post comprising an upwardly extending yoke attached to the handlebar, a tubular post portion unitary with the yoke, the tubular post portion attachable to the snowmobile frame, and a lower steering arm at the lower end of and unitary with the tubular post portion, the lower steering arm projecting at an angle downwardly, forwardly and to the right. The steering post is unitarily formed by forging, casting, metal injection molding or the like. A central bore extending through the steering post formed by machining, the pair of bearing surfaces on the steering post formed by machining, two upper yoke arms machined to receive a handlebar clamp and the handlebar. The steering system may include a pair of spacer members receivable by the yoke, the spacer members then receiving the handle bar for providing handlebar height adjustment.

12 Claims, 11 Drawing Sheets

(56) References Cited

U.S. PATENT DOCUMENTS

| | | | |
|---|---|---|---|
| 8,919,477 B2 | 12/2014 | Conn et al. | |
| 9,428,232 B2* | 8/2016 | Ripley | B62D 55/104 |
| 9,610,986 B2 | 4/2017 | Conn | |
| 2004/0247384 A1* | 12/2004 | Henricksen | B62K 21/04 |
| | | | 403/344 |
| 2008/0264196 A1* | 10/2008 | Schindler | B62K 21/16 |
| | | | 74/493 |
| 2012/0304804 A1* | 12/2012 | Ferguson | B62K 21/14 |
| | | | 74/551.2 |
| 2021/0245830 A1* | 8/2021 | Wideman | B62K 21/16 |
| 2024/0199163 A1* | 6/2024 | Ahmad | B62J 11/10 |

* cited by examiner

SNOWMOBILE STEERING SYSTEM

This application claims the benefit of U.S. Provisional Application No. 63/351,126 filed on Jun. 10, 2022. Said application is incorporated by reference in its entirety herein.

BACKGROUND OF THE INVENTION

Snowmobiles have evolved over several decades and manufacturers are always looking for improvements in manufacturing, performance, and rider comfort. Manufacturing improvements generally include minimizing assembly steps and number of parts and may result in lower pricing to the consumer and better margins for the manufacturer. Performance improvements can be had by, for example, reducing the weight of the snowmobile which can aid in acceleration, handling, and braking. Performance and improved rider comfort can also be provided by positional adjustability of required components such as handlebars. Such manufacturing, performance, and rider comfort improvements are well received by the snowmobiling industry and consuming public.

SUMMARY OF THE INVENTION

A snowmobile has a steering system with a handlebar, the system having a steering post comprising an upwardly extending yoke attached to the handlebar, a tubular post portion unitary with the yoke, the tubular post portion having a pair of bearing surfaces for structural rotatable attachment to the snowmobile frame, and a lower steering arm at the lower end of and unitary with the tubular post portion, the lower steering arm projecting at an angle downwardly, forwardly and to the right, the lower steering arm defining a connection joint for a steering rod. The steering post unitarily formed by forging, casting, metal injection molding or the like. A central bore extending through the steering post is formed by machining, the pair of bearing surfaces on the steering post formed by machining, two upper yoke arms each machined to receive the snowmobile handlebar and a yoke cap for clamping the handlebar to the steering post. In embodiments, the upper yoke arms may each receive a spacer member that mates with the respective upper yoke arms and provides a raised attachment and clamping position for the handlebar. The yoke cap configured for clamping the handlebar to the spacer members and the steering post.

A feature and advantage of embodiments is that differently sized spacer members may be available to provide a variety of handlebar height options. Such spacers may be provided with a new snowmobile or may be available after purchase. Conventionally, means for adjusting the height of snowmobile handlebars has not been readily available. And such means were not convenient or inexpensive, particularly for the average snowmobile enthusiast.

A feature and advantage of embodiments is a steering assembly with fewer parts that require fewer assembly steps and that weighs less than conventional steering assemblies. In an embodiment, a steering post preform has all portions simultaneously formed by casting, forging, metal injection molding or the like. Interface surfaces are machined subsequent to the formation of the preform. A bore may be gun drilled through the length of the steering post preform providing significant weight reduction while not compromising the strength of the steering post. In embodiments, blind holes may be provided in one or both ends of the preform providing a weight reduction.

A feature and advantage of embodiments is that exposed componentry connecting the handlebar to the steering column is simplified with less structure and bracketry exposed providing less catch points and a more aesthetically pleasing appearance.

A feature and advantage of embodiments is that quality control issues associated with welding components of a steering post together are eliminated. In embodiments, the steering post has no weldments.

A feature and advantage of embodiments is that improvements in performance, manufacturing efficiency, and rider comfort are provided by embodiments described herein.

DETAILED DESCRIPTION

Figure 1:
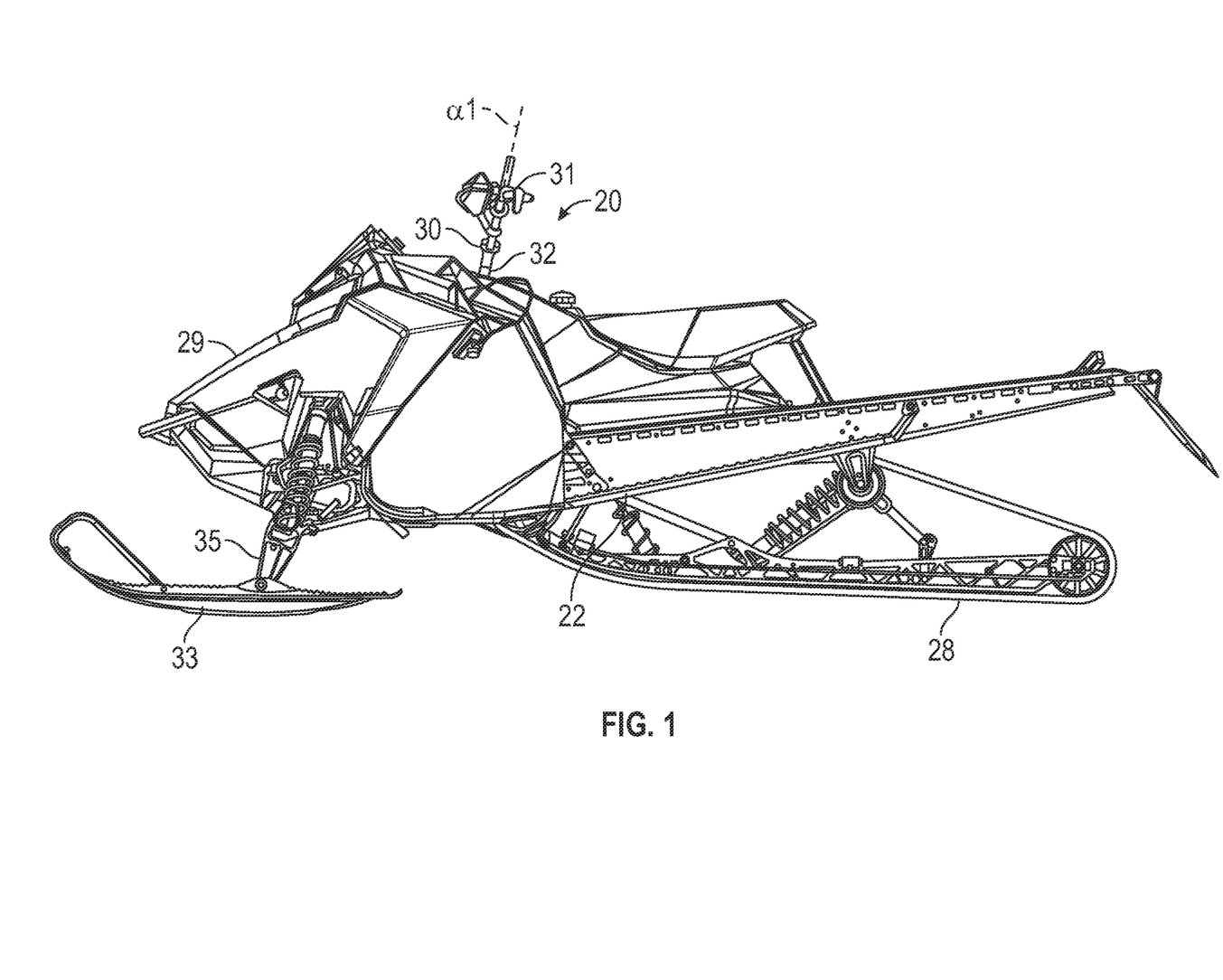
FIG. 1 is a side elevational view of a snowmobile with an improved steering system.

Referring to FIG. 1, a snowmobile 20 has a frame 22 that supports a body 24, a drive track 26 driving by an engine, not shown, and a steering system 30 including handlebars 31 and steering post 32. The handlebars are rotatable left or right about an upright axis α1, in a well-known manner, that then steers the skis 33 through the steering system. The skis further supported by a suspension system 35, also supported by the snowmobile frame 22. Snowmobiles and steering systems of snowmobiles are disclosed in, for example, U.S. Pat. Nos. 9,610,986; 9,428,232; 8,919,477; 7,559,576; and 6,125,958; all of which are owned by the owner of this application. Said patents are incorporated by reference herein for all purposes.

Figure 2:
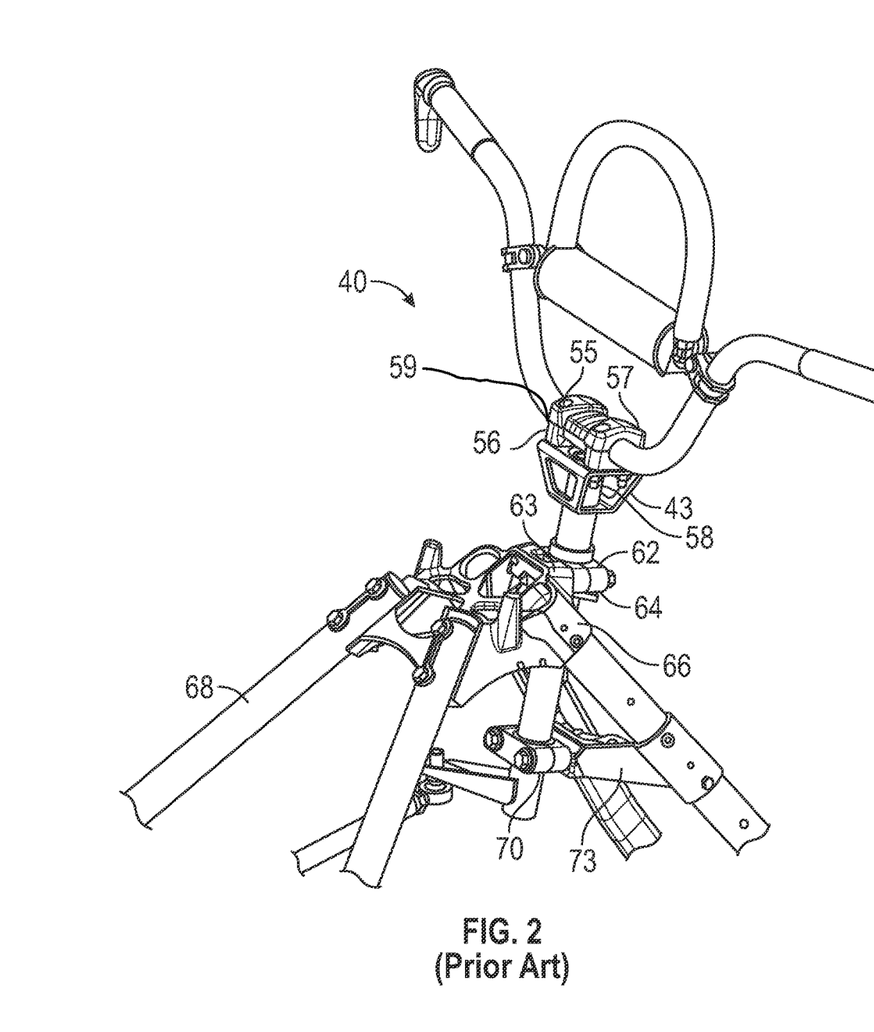
FIG. 2 is a perspective view of a Prior Art snowmobile steering system in a snowmobile framework.
Figure 3:
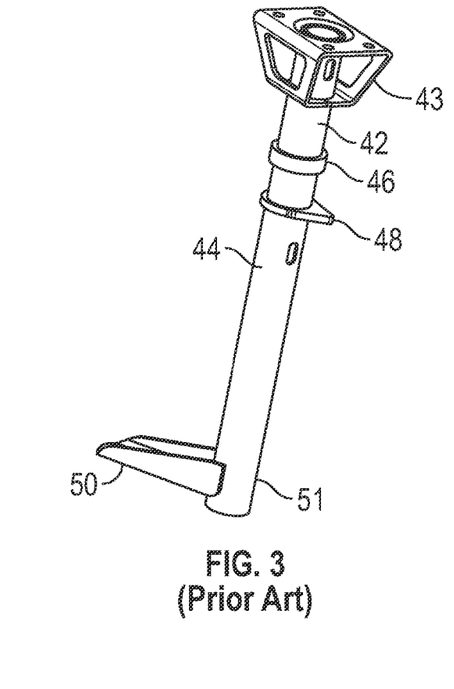
FIG. 3 is a perspective view of a Prior Art snowmobile steering column.
Figure 4:
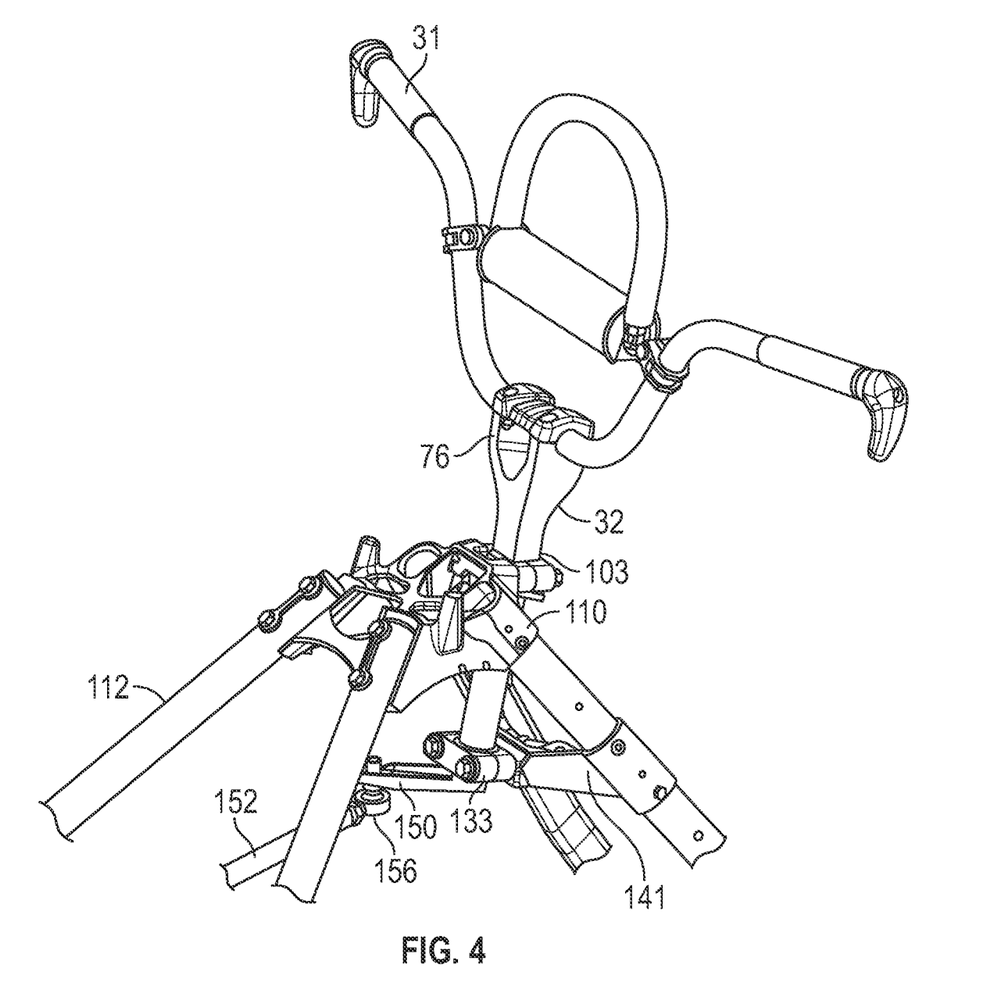
FIG. 4 is a perspective view of a steering system in a snowmobile frame.
Figure 5:
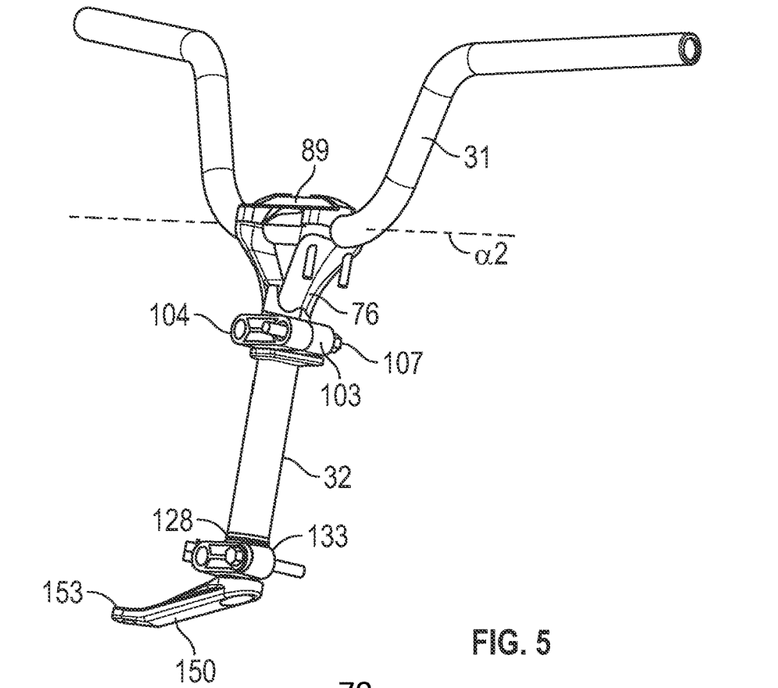
FIG. 5 is a perspective view of a snowmobile steering system.
Figure 6:
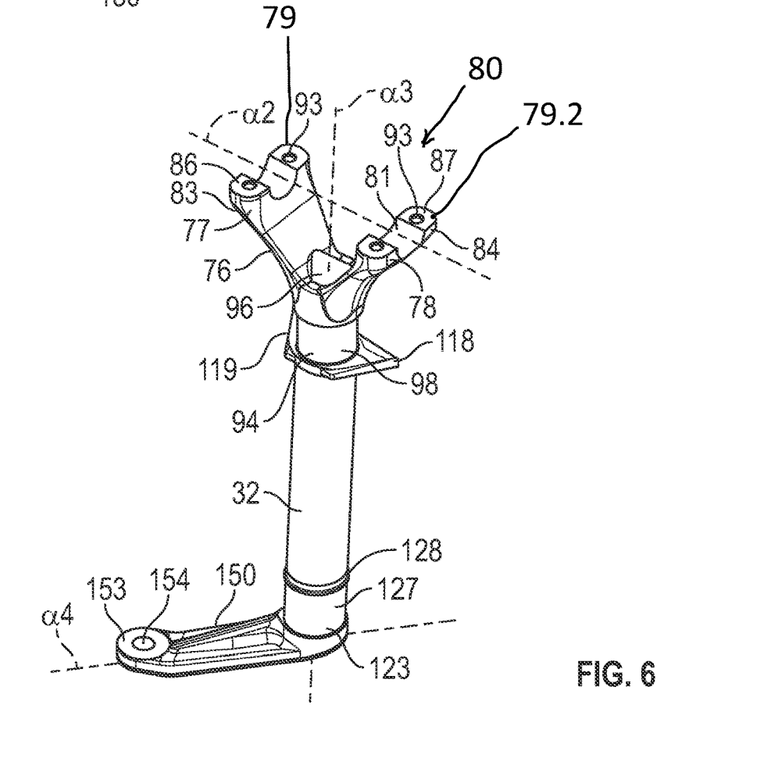
FIG. 6 is a perspective view of a steering post of the steering system of FIG. 5.
Figure 7:
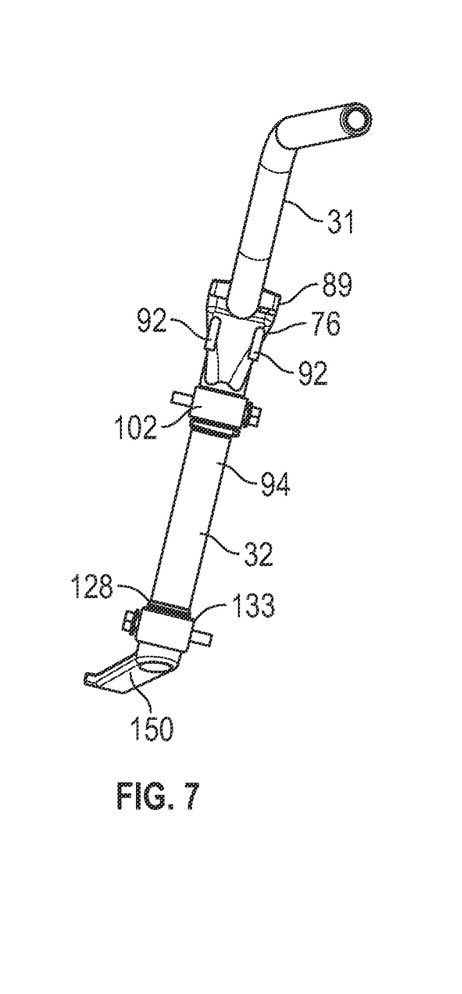
FIG. 7 is a side elevational view of the steering system of FIG. 5.
Figure 8:
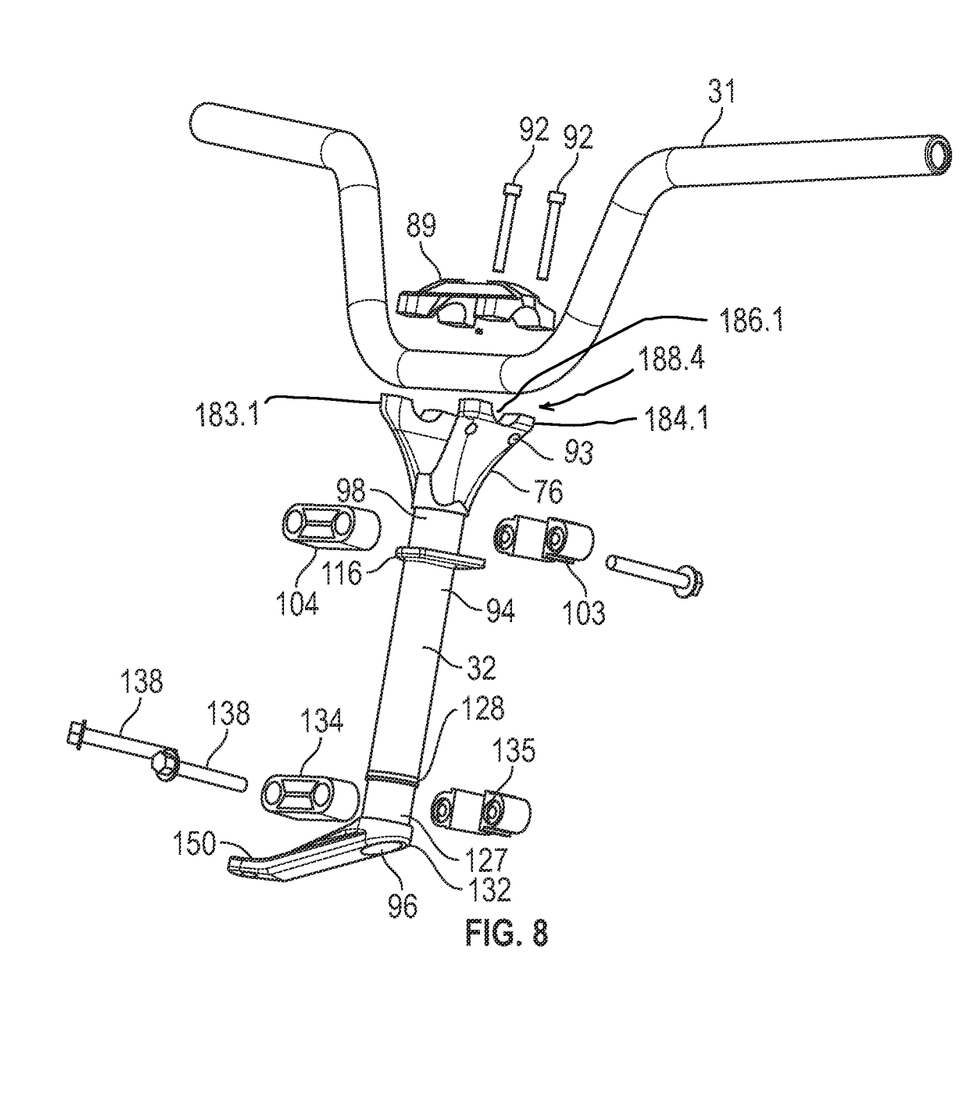
FIG. 8 is an exploded view of the steering system of FIGS. 5 and 7.

Referring to Prior Art FIGS. 2 and 3, a conventional snowmobile steering system 40 has a conventional steering post 42 that has components welded together. The post has an upper handlebar mounting bracket 43 formed of stamped steel welded to steel tubing 44. A collar 46 and flange 48 are welded to the tubing. A lower steering arm 50 form of stamped steel is welded on the lower end 51 of the steel tubing 44. The handlebar mounting bracket 43 is bolted to a handlebar clamp 55 having a pair of handlebar clamp halves 56, 57 with bolts 58 extending though the handlebar clamp to bolt same to the handlebar mounting bracket 43. The handlebar clamp halves 56, 57 positioned on the mounting bracket defining handlebar receiving portions and together a handlebar seat 59 for receiving the handlebar. An upper bushing assembly 62 formed of a pair of bushing halves 63, 64 attaches about the upper portion of the conventional steering post and to a steering support bracket 66 of the snowmobile frame 68. A lower bushing assembly 70 attaches about the lower end 51 of the conventional steering post 42 and connects to the snowmobile frame 68 at lower steering bracket 73. Linkages for connection between the steering post and skis are illustrated in the patents in the paragraph immediately above.

Figure 9:
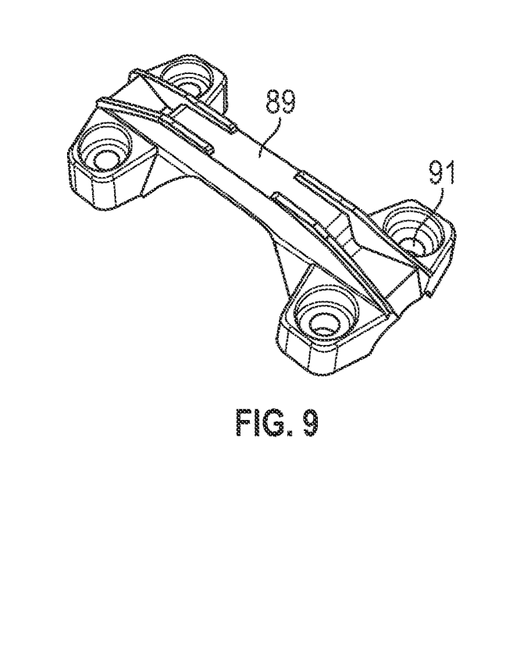
FIG. 9 is a perspective view of the yoke cap.
Figure 10:
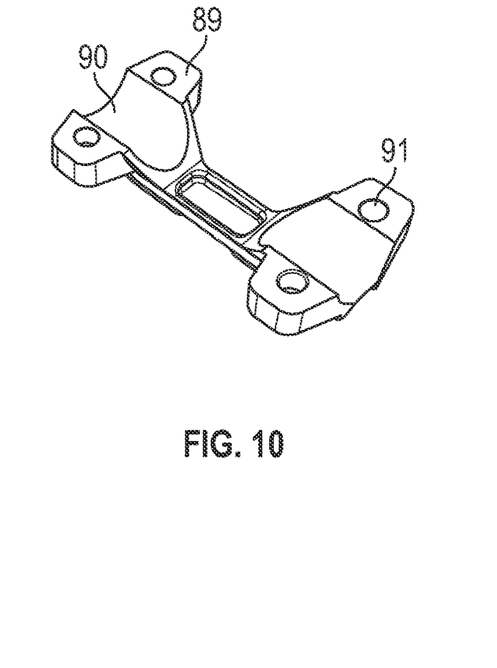
FIG. 10 is a perspective view of the underside of the yoke cap.
Figure 11:
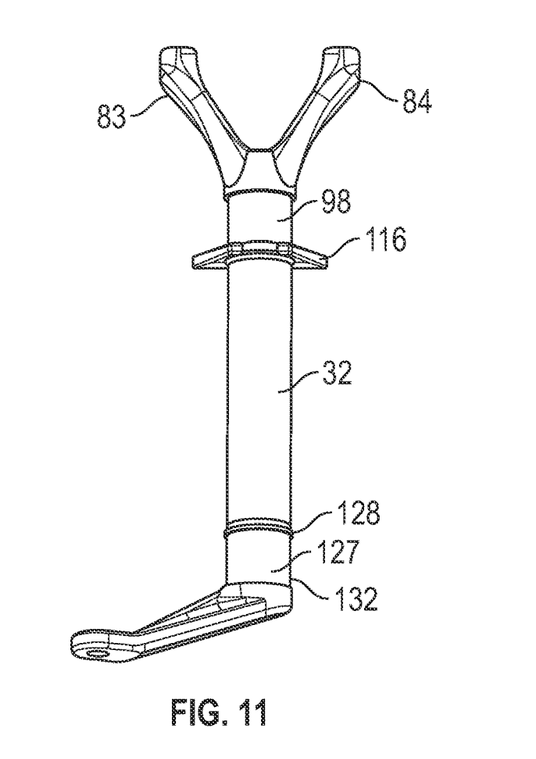
FIG. 11 is a front elevational view of the steering post of FIG. 6.
Figure 12:
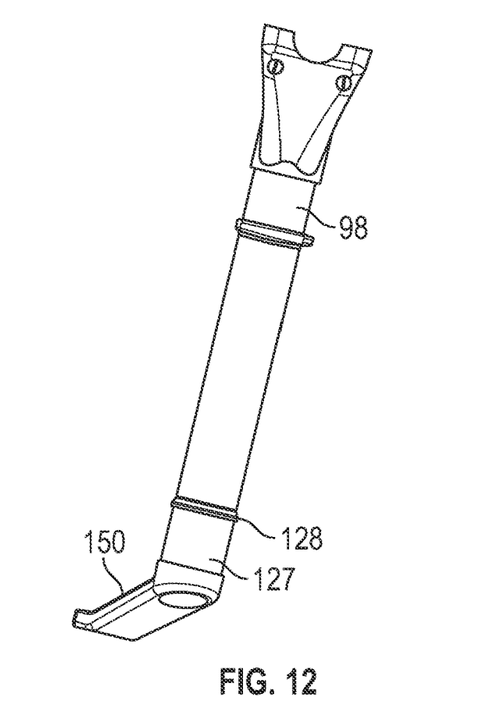
FIG. 12 is a side elevational view of the steering post of FIGS. 6 and 11.
Figure 13:
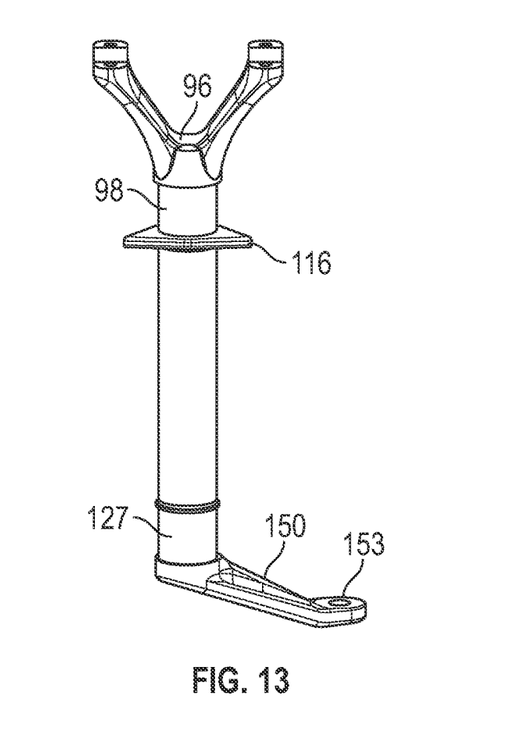
FIG. 13 is a rear elevational view of the steering post of FIGS. 6, 11, and 12.
Figure 14:
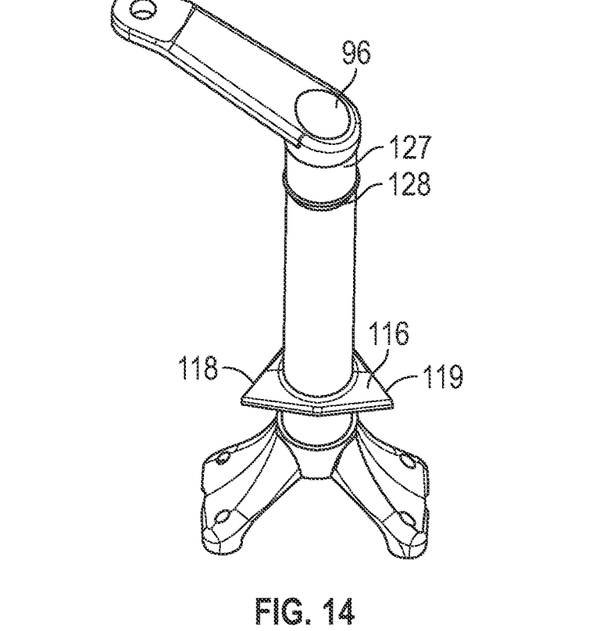
FIG. 14 is a perspective view of the steering column of FIGS. 6, 11, 12, and 13.

Referring to FIGS. 4-14, in embodiments, the steering system 30 with the steering post 32 is suitable for use in association with conventional snowmobile frames such as shown in Prior Art FIG. 2, as well as other snowmobile frames and in association with conventional linkages connecting the steering posts to skis as illustrated in the patents incorporated by reference above, for example. The steering post may be formed by casting, forging, powder metal compacting, printing, or metal injection molding or other means of simultaneously forming componentry of the steering post. In embodiments, the steering post has no weldments. The steering post 32 has a handlebar receiving portion configured 76 as an upper yoke portion with two separated yoke arms 77, 78 each defining handlebar receiving portions 79, 79.2 and a handlebar seat 80. The upper yoke portion 76 having a recess 81 sized for the handlebar 31. The yoke portion having a Y-shape. The ends 83, 84 of the yoke arms having machined surfaces 86, 87 for interfacing with a double or bridging upper clamp portion configured as a yoke cap 89. The yoke cap 89, in embodiments, having an I-shape as best shown in FIGS. 9 and 10, and having a recess 90 for the handlebar and non-threaded holes 91 for alignment with and connection to both ends 83, 84 of the yoke arms. The recesses of the yoke portion 76 and yoke cap 89 together defining an opening for the handlebar the opening having a handlebar recess axis α2. The yoke cap 89 secured to the yoke portion by way of fasteners, for example screws 92, with the handlebar clamped therebetween. The screws extending into threaded holes 93 machined into the yoke arms.

Figure 15:
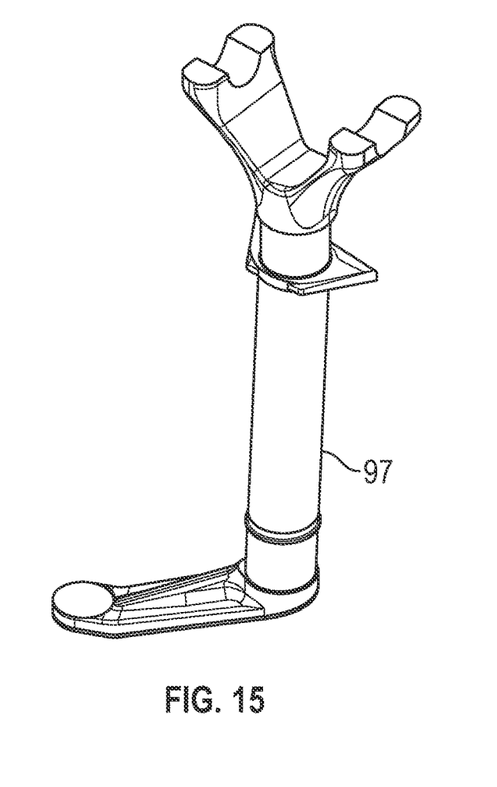
FIG. 15 is a perspective view of a preform before machining the preform into the steering post.

Continuing to refer to FIGS. 4-14, the yoke portion joins a tubular post portion 94 that is tubular by way of a bore 96 that may be machined into a preform 97 of the steering post. FIG. 15 illustrates a preform 97. In embodiments, rather than a single bore extending the length of the steering post 32, one or more blind holes may be provided in each end or one end of the steering post preform. The tubular post portion 94 having an axis α3 that is coaxial with the upright axis α1. The steering post 32 has a first machined bearing surface 98 on the post portion immediately below the yoke portion 76. The bearing surface for receiving a bushing assembly 102 comprising bushing halves 103, 104 that are secured together with threaded fasteners 107, such screws or bolts, that may also connect to a steering support bracket 110 as part of the snowmobile frame 112; see, in particular, FIG. 4. A flange 116 is positioned immediately below the first bearing surface 98 that may provide rotational stop surfaces 118, 119 for the steering post. At the lower end 123 of the steering post 32, a lower machined bearing surface 127 with a collar 128 there above that receives a second bushing assembly 133 comprising a pair of bushing halves 134, 135 secured together by threaded fasteners 138 that may be bolts or screws and that may fasten the bushing assembly to a lower steering bracket 141 as part of the snowmobile frame 112. The collar 128 providing positional constraint to the steering post with respect to the bushing assembly and correspondingly the snowmobile frame 112.

In embodiments, at the lower end 123 of the tubular post portion, a steering arm 150, unitary with the tubular post portion without weldments. The steering arm 150 having a steering arm axis α4 that extends outwardly and downwardly with respect to the steering post axis α3 for pivotal connection with a steering link 152. The arm end 153 may be machined with a hole 154 for making the pivoting connection 156 with the steering link 152.

Referring to FIG. 15, the preform 97 that may be formed by casting, forging, printing, powder metal compacting, or metal injection molding or other means and is depicted before machining the central bore 96, bearing surfaces 98, 127 and interface surfaces 86, 87 for the yoke cap 89, as well as the holes for the threaded fasteners. The yoke cap may be similarly formed or may be injection molded from polymers, such as glass filed nylon, for example, or may be machined from aluminum or steel or other metals or other materials.

Figures 16, 17:
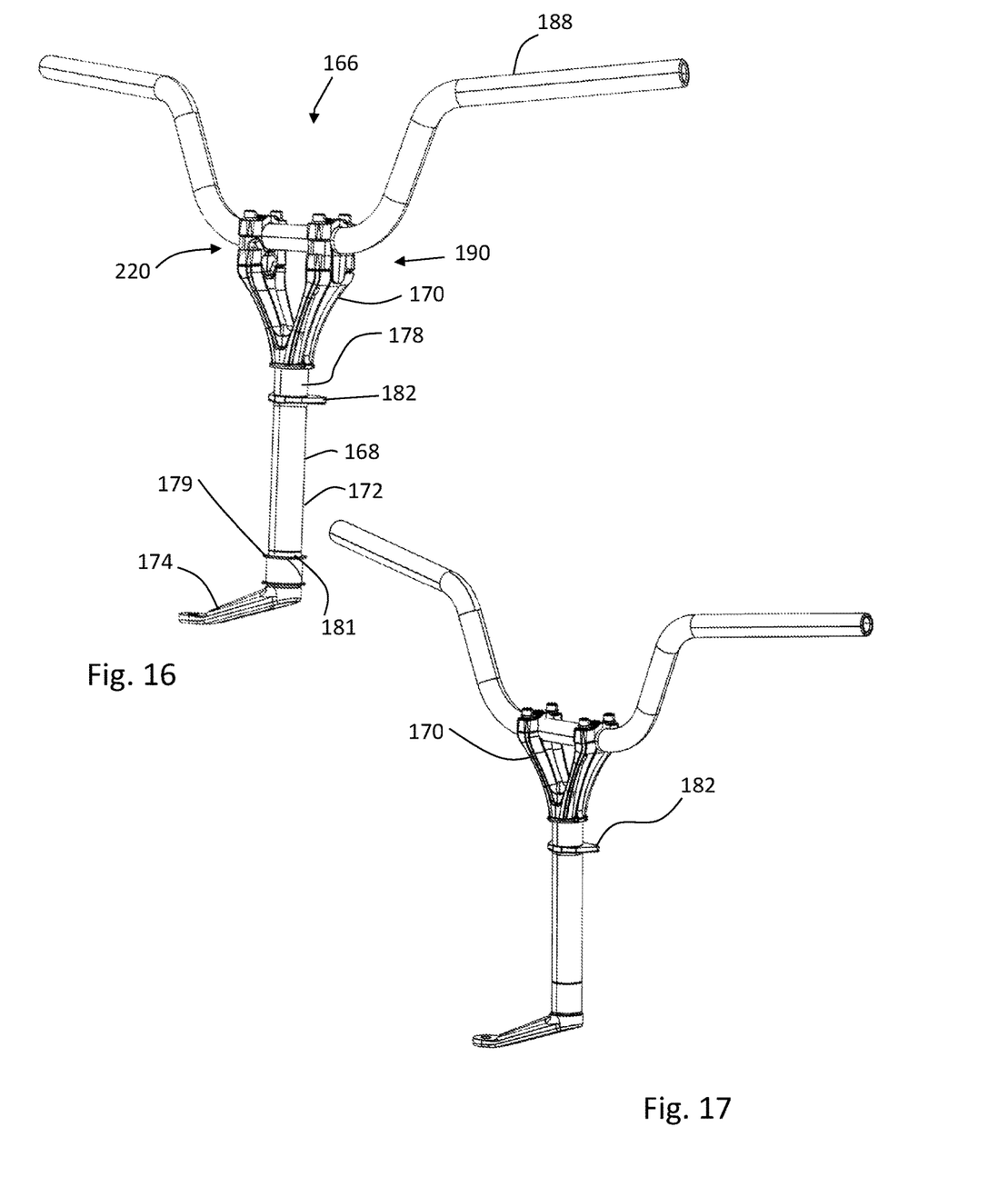
FIG. 16 is a perspective view of a snowmobile steering system with height adjustability shown in an upper position.
FIG. 17 is a perspective view of the snowmobile steering system of FIG. 16.
Figure 18:
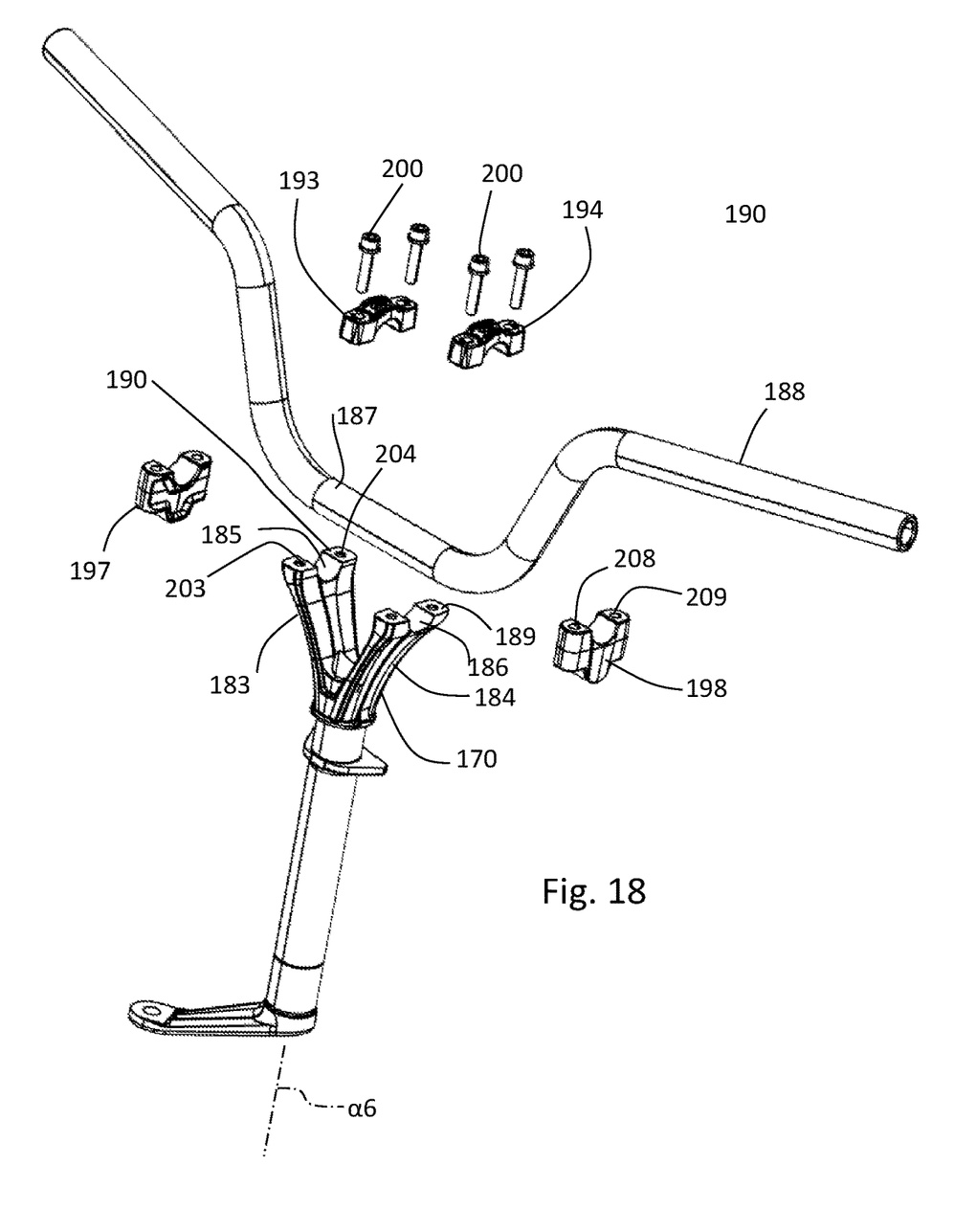
FIG. 18 is an exploded view of the adjustable steering system of FIG. 16.
Figure 19:
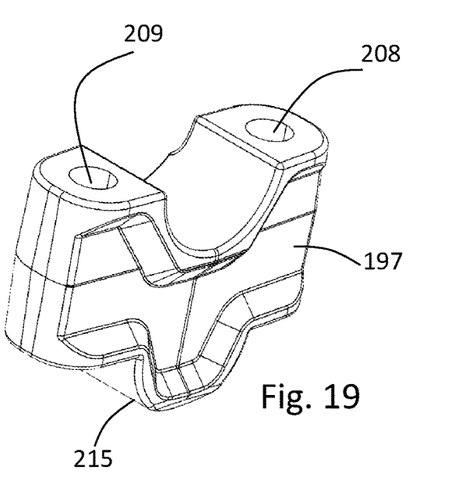
FIG. 19 is a perspective view of a spacer member of the steering system of FIG. 16.
Figure 20:
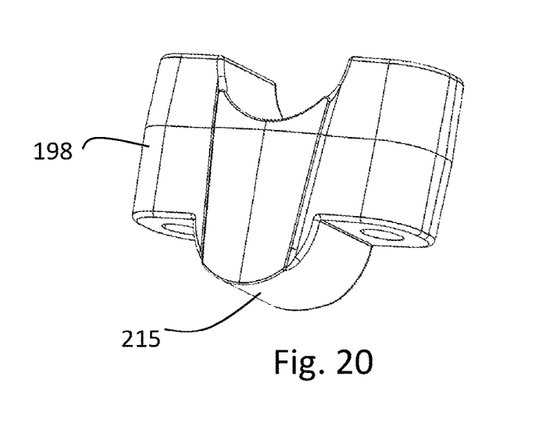
FIG. 20 is another perspective view of the spacer member of FIG. 19.
Figure 21:
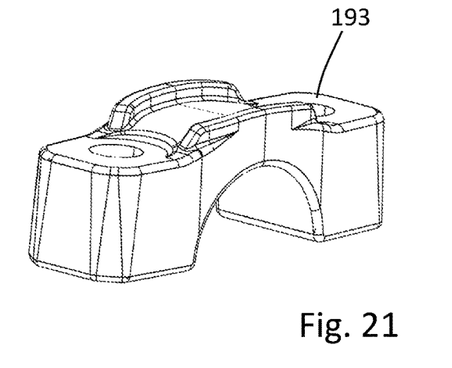
FIG. 21 is a perspective view of a yoke cap of the steering systems of FIGS. 16 and 17.
Figure 22:
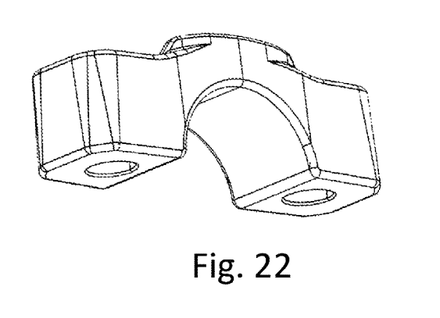
FIG. 22 is another perspective view of the yoke cap of FIG. 21.

Referring to FIGS. 16-18, another steering system 166 is depicted that may utilize a unitarily formed steering post 168 formed by casting, forging, metal injection molding, printing, powder metal compacting, or other means. The steering post having a yoke portion 170, a tubular post portion 172 unitary with the yoke portion and extending to a steering arm 174 unitary with the post portion 172. The post portion may have machined surfaces including an upper machined surface 178 and a lower machined surface 179. The machined surfaces cylindrically shaped for providing rotating interface with the snowmobile frame. FIG. 16 shows a bushing 181 on the lower machined surface. Flange 182 may include stop surfaces as described with respect to FIG. 19 that engage with cooperating structure fixed with respect to the snowmobile frame to limit the rotational motion about the post portion axis α6.

Referring to FIGS. 16-22, attached to the yoke portion is a handlebar clamp system 180 that provides for alternate handlebar mounting heights. The yoke portion 170 has a pair of yoke arms 183, 184, each defining a handlebar receiving portion 183.1, 183.2 that has a central recess 185, 186 conformingly shaped and having arcuate receiving surfaces 185, 186 conformingly shaped to the shape of the exterior surface 187 of the handlebar 188 and defining handlebar receiving recesses 185.1, 186.1. Upwardly facing flat machined surfaces 189, 190, may interface with yoke caps, such as singular yoke caps 193, 194 as illustrated in FIG. 16, or with U-shaped spacer members 197, 198 as illustrated in FIG. 17. The arrangement of FIG. 16 providing an elevated handlebar seat 200 compared to the arrangement of FIG. 16.

The yoke caps 193, 194 that are utilized for the configuration of FIG. 16 also may interface with the spacer members 197, 198 to clamp the handlebar therebetween. Screws 201 extend through the yoke caps 193, 194 into the threaded holes 203, 204 of the yoke arms and where spacer members 197, 198 are utilized, through the apertures 208, 209 in the spacer members. For structural rigidity the spacer members 197, 198 on a yoke arm interface side 214 may have downward projections 215 that are shaped similar to the handlebar and are conformingly sized to the arcuate receiving surfaces 185, 186 and recesses 185.1, 186.1 of the yoke arms 183, 184. Placement of the spacers 197, 198 on the handlebar receiving portions of the yoke arms provide the new elevated handlebar seat 200 defined by the handlebar receiving recesses 205, 206. The stack 220 of the yoke arms, the spacer members, and the yoke caps with the handlebar clamped therein provides a highly rigid and structurally strong arrangement that allows the handlebar height position to be elevated.

In embodiments, alternate sizes of the spacer members may be utilized thereby providing alternate mounting heights of the handlebar. In embodiments, more than one spacer member may be utilized on each yoke arm; that is, the spacers may be stacked. In embodiments, the double crossing yoke cap 89 may be utilized in the system utilizing the spacer members for adjusting handlebar height. In embodiments, the spacer members may be utilized with conventional steering systems such as illustrated in FIGS. 2 and 3 providing alternate handlebar height positions. The spacer members interfacing with the lower handlebar clamp half 56.

In embodiments, the positioning of the bearing surfaces and unitary steering arms may be varied. For example, the steering arm may be positioned intermediate the upper and lower bearing surfaces on the post portion. In embodiments, the angulation of the steering arm with respect to the other portions of the steering post may be varied from the illustrated figures, and in embodiments, more than one steering arm may be provided.

When "vertical" or "horizontal" or "above" or "below" or other forms of those words or like words are used herein, such usage does not require precise vertical or horizontal alignment. "Vertical" meaning only generally more vertical than horizontal for instance; "horizontal" meaning more horizontal than vertical, for instance. In embodiments, "portions" may be a separate component or a unitary with other components or portions. As depicted, the yoke portion, upper bearing surface, flange, lower bearing surface, and steering arm are simultaneously formed by casting, forging, or other methods. In embodiments, specific components may be welded to a forged, cast, or otherwise formed preform without all of these specific portions in the preform.

All the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

The invention claimed is:

1. A steering system for a snowmobile having a snowmobile frame, the steering system comprising:
a handlebar;
a unitarily formed steering post comprising an upper yoke portion with two separated yoke arms, each yoke arm having a central recess sized to a handlebar and a pair of screw holes, one screw hole positioned on a forward side of the receiving recess and one screw hole on the rearward side of the handlebar recess, the steering post further comprising a tubular portion extending from the upper yoke portion downwardly, the tubular portion having an upper bearing portion with a bearing surface thereon for rotatably connecting to the snowmobile frame, a flange portion positioned below the upper bearing portion, the tubular portion extending below the flange portion to a steering arm that extend forwardly, to the right and downwardly, a lower bearing portion positioned on the tubular portion directly above the steering arm, the lower bearing portion having a bearing surfacer there; and
a yoke clamping cap having a recess for receiving the handlebar and a plurality of cooperating screw holes that align with the pair of screw holes in each yoke arm;
a plurality of screws for clamping the handlebar positioned in between the upper yoke portion and the yoke clamping cap; and
wherein the unitarily formed steering post is formed from a preform that is then machined, the preform having surfaces machined at upper ends of each yoke arm, the upper bearing portion, and the lower bearing portion.

2. The steering system of claim 1, wherein the unitarily formed steering post is formed by one of casting, forging, printing, and metal injection molding.

3. The steering system of claim 1, further comprising two spacer members, one each for each of the yoke arms, the spacer members each having a yoke arm interface side with a projection sized to the handlebar whereby said projections are receivable by respective central recesses of the pair of yoke arms, each spacer member having a handle bar interface side with a recess sized for receiving the handlebar, each spacer member further having a plurality of screw holes that align with respective holes of each yoke arm.

4. The steering system of claim 3 in combination with a snowmobile frame.

5. The steering system of claim 1 wherein the tubular portion is formed from a preform with a bore drilled lengthwise through the preform forming the tubular portion.

6. The steering system of claim 1, wherein the steering post has no weldments.

7. A steering post system for a snowmobile, the steering post system comprising:

a steering post formed of metal and having an upper yoke portion with two separated yoke arms, each yoke arm having a central recess sized for a handlebar, the two recesses having a recess axis, each yoke arm having a plurality of screw holes positioned on each of the two sides of the recess, the steering post further comprising a tubular portion with an tubular portion axis extending from the upper yoke portion downwardly, the tubular portion having an upper bearing portion with a bearing surface thereon for rotatably connecting to the snowmobile frame, a flange portion positioned below the upper bearing portion, the tubular portion extending below the flange portion to an elongate steering arm with a steering arm axis that extends outward at an obtuse angle to the tubular portion axis, the steering arm having an arm end portion with a hole for connection with a steering connecting rod, the steering post system further comprising a pair of spacer members, one each for each of the yoke arms, the spacer members each having a yoke arm interface side with a projection sized to the handlebar whereby said projections are receivable by respective central recesses of the pair of yoke arms, each spacer member further having a handlebar side with a recess sized for a handlebar, each spacer member having a plurality of screw holes that align with respective holes of each yoke arm; and at least one yoke cap, each yoke cap having a lower side with a recess for receiving a handlebar, whereby the steering post system provides two alternative handlebar mounting heights by utilizing or not utilizing the pair of spacer members.

8. The steering post of claim 7, wherein the steering post has no weldments.

9. The steering post system of claim 8, wherein the steering post is formed from a preform that is then machined, the preform having surfaces machined at upper ends of each yoke arm, the upper bearing portion, and the lower bearing portion.

10. The steering post system of claim 9, wherein the at least one yoke end cap is only one yoke cap and said one yoke cap has an I-shape when viewed from above the yoke end cap.

11. The steering post system of claim 9, wherein the at least one yoke end cap is two yoke end caps, each yoke end cap attachable to one of the two separated yoke arms.

12. The steering post system of claim 9, wherein the steering post is formed by one of casting, forging, printing, powder metal compacting, or metal injection molding.

* * * * *